United States Patent [19]

Epper et al.

[11] 4,283,938

[45] Aug. 18, 1981

[54] METHOD AND APPARATUS FOR DYNAMIC CONCENTRATION OF A SUSPENSION

[75] Inventors: Wolfgang Epper, Bergheim-Zievenich; Rupprecht Graf, Cologne, both of Fed. Rep. of Germany

[73] Assignee: Klöckner-Humboldt-Deutz AG, Fed. Rep. of Germany

[21] Appl. No.: 71,112

[22] Filed: Aug. 30, 1979

[30] Foreign Application Priority Data

Oct. 9, 1978 [DE] Fed. Rep. of Germany ....... 2844023

[51] Int. Cl.³ .......................................... G01N 11/14
[52] U.S. Cl. ..................................... 73/59; 73/61 R; 137/92; 210/367; 210/397
[58] Field of Search ................. 73/59, 61 R; 210/367, 210/380 R, 396, 397; 137/4, 92

[56] References Cited

U.S. PATENT DOCUMENTS

| 1,219,796 | 3/1917 | Atkins | 210/397 X |
| 2,038,921 | 4/1936 | Blaufuss | 210/397 |
| 2,626,786 | 1/1953 | McGlothlin | 73/59 X |
| 2,799,397 | 7/1957 | Berline | 210/397 X |
| 3,322,277 | 5/1967 | Pearson, Jr. et al. | 210/396 X |

FOREIGN PATENT DOCUMENTS

| 130709 | 12/1959 | U.S.S.R. | 73/59 |
| 584228 | 12/1977 | U.S.S.R. | 73/59 |

Primary Examiner—S. Clement Swisher
Assistant Examiner—Joseph W. Roskos
Attorney, Agent, or Firm—Hill, Van Santen, Steadman, Chiara & Simpson

[57] ABSTRACT

In the dynamic concentration of a suspension, in which the suspension is fed into a filter which has a driven stirring device, and in which the suspension forms a filter cake which is continually remixed by stirring with the suspension being dehydrated and maintained in a liquid state up to a desired degree of concentration, the power consumption of the stirring device is measured, in particular the torque is measured, and the intensity of the stirring motion is controlled in accordance with the measured torque by causing a change in the number of revolutions per minute of the stirring device in response to the torque transgressing an upper limit or a lower limit.

14 Claims, 2 Drawing Figures

METHOD AND APPARATUS FOR DYNAMIC CONCENTRATION OF A SUSPENSION

BACKGROUND OF THE INVENTION

1. Field of the Invention

The invention relates to a method and apparatus for the dynamic concentration of a suspension by means of a closed filter, and more particularly to such a method and apparatus in which a dynamic multi-stage pressure filter is equipped with a stirring device and the filter cake being formed is continuously remixed by stirring with the suspension to be dehydrated so that the same is kept in the liquid state until the desired degree of concentration is attained.

2. Description of the Prior Art

Techniques for dynamic concentration of a suspension including both method and apparatus, are well known in the art. For example, an account of such a technique is provided in a technical article in the periodical "Chemie-Ing.-Techn. 43, Vol. 1971/No. 6" at Pages 380–386.

Such dynamic filters are based on the operating principle of removing the solid coating, the so-called filter cake, which forms on the filter medium during the concentration of the suspension at the very moment that it arises. This is meant to prevent a build-up of a progressive resistance for the further feed of the suspension. In order to achieve this, therefore, the developing filter cake is continuously remixed during the concentrating process with the suspension and is repeatedly advanced to the filter medium and is thereby maintained in the liquid state by means of an energy feed until a viscosity is reached at which, given the influence of the aggitation of the stirring device, flowability of the filter cake and, thus, its dischargeability on the basis of the drop of pressure in the suspension space is just still retained.

In this method, there is a very small working latitude between the attainment of a satisfactory degree of concentration of the concentrate and the blocking of the filter due to the loss of flowability of the concentrate. This leads to the disadvantage of control problems which are extremely difficult because they are delicate.

According to the cited publication, it has therefore already been attempted to initiate an improvement of the operating conditions by means of intermittent opening and closing of the discharge for the concentrate. However, such a method is connected, in practice, with significant difficulties in terms of control engineering and, in addition, has the aggravating disadvantage of an excessive stress of the filter coatings. For continuous dynamic concentration, it has already been proposed in Austrian Pat. No. 290,563 to control the discharge of the thickened suspension as a function of the drive torque of the stirring device, whereby, in the case of the increase of the torque over a predetermined value, the element for discharging the thickened suspension is opened to a greater degree and, in the reverse case, it is closed to a greater degree or completely.

The known method, however, has the disadvantage that, on the one hand, the viscosity and/or moisture of the discharge concentrate fluctuates within broad limits. In addition, the filter media are subjected to a high stress due to changing pressure conditions or pressure surges. Also, given substances which tend toward spontaneous thixotropy, a blockage of the filter cannot be prevented with certainty. Furthermore, there is the disadvantage that the output of the filter is reduced and that, finally, in concentrating viscous media, particularly in multi-stage filters, the control operation requires an excessive amount of time until the same becomes effective so that, despite the control, disruptions due to the blockage of the filter and, therefore, shutdown of the operation can occur.

SUMMARY OF THE INVENTION

The object of the present invention is to provide a method and an apparatus for the continuous dynamic concentration of suspensions which, according to technical estimation, safely avoids the blockage of the filter, is uncomplicated, allows employment of known dynamic filter types without further difficulties, and which, in a preferably fully continuous operating manner, guarantees an optimum of filter capacity with the highest possible degree of concentration without stressing the filter media to an unnecessarily great degree.

It has been surprisingly discovered that the aforementioned object is achieved in that the intensity of the stirring action is set according to the measure of the power consumption of the stirring device. Therefore, this measure is advantageously exploited, preferably given a predetermined RPM, in that the output of the stirring device drive is measured and the RPM is increased when an upper output index value is exceeded and the RPM is reduced when a lower output index value has been transgressed.

The advantages of the present invention are as follows:

1. A fully continuous method of operation is retained;
2. An optimum admission for achieving the best possible capacity charge is assured;
3. The filter achieves the highest possible degree of concentration of the concentrate with the lowest possible fluctuations;
4. The method is suitable for known filter types for dynamic concentration of a suspension; and
5. Apparatus constructed in accordance with the present invention is not complicated, can be manufactured with standard components, and is extremely cost effective.

In a preferred embodiment of the method, a predetermined RPM is preferably suddenly changed by an amount when the upper index value or the lower index value is transgressed; that the changed RPM is retained for the duration of a predetermined time independently of the output; and that the predetermined RPM is again set after the termination of the predetermined interval.

In an advantageous embodiment of the method of the invention, it is provided that, for determining the output, the torque of the steering device is measured.

Thereby, the measure can be advantageously used that the gradient of the change of the torque per time unit is measured and the amount of the RPM change is determined according to the measure of the gradient.

This measure has the advantage that a flexible adaptation of the control operation to the specific theoretical properties of the filtered media is rendered possible.

Further, a method, practiced according to the present invention, provides that the changed RPM is kept approximately constant during the predetermined time interval and that a signal indicating the magnitude of the torque is preferably switched off during that interval.

In an expedient development of the invention, it is further provided that a resistance controlling the discharge of the concentrate is reduced at the same time as the increase of the RPM and/or a resistance controlling the intake of the suspension is increased, and vice-versa.

With this measure, which is known per se, the method of the present invention can be advantageously additionally further improved in the sense of an optimization if, for example, simultaneously with an RPM increase and a reduction of the viscosity and thickness of the filter cake caused by so doing as well as a reduction of the thixotropy of the concentrate, additional small resistance changes at the intake or discharge maintain the through put and filtration behavior of the substances nearly in a state of equilibrium.

Apparatus constructed in accordance with the present invention, and for implementing the method of the present invention, with a dynamic filter equipped with a stirring device provides that the stirring device include devices for measuring the drive power, as well as for controlling the RPM according to the measured drive power.

An embodiment of apparatus constructed in accordance with the present invention provides that the measuring device is connected via a control line with a logic and control unit which compares the index values of the upper and lower power limits offered by means of an input unit with the measured actual value and, when an index value is transgressed, triggers a control pulse ($\Delta U$) for changing the RPM, which control pulse is applied to the control element by way of a control line and a time delay relay. The time delay relay maintains the changed RPM constant for the duration of a predetermined interval independently of the drive power.

A further expedient development of the apparatus is that the time delay relay exhibits an input unit for determining a time and is connected with a memory unit for storing the control pulse ($\Delta U$) and is also connected by way of a control line with a switching element which, after the change of RPM, interrupts the control line, whereas the memory unit maintains the changed RPM constant.

Thereby, it is provided in further development that a signal for the basic setting of the RPM is applied to the control unit with an input unit.

Finally, in an advantageous development of the invention, the arrangement can be undertaken that a volume controlling valve is arranged in the intake of the filter and a volume controlling valve is arranged in the discharge, which valves are controlled by the logic and control unit with the assistance of the control lines.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
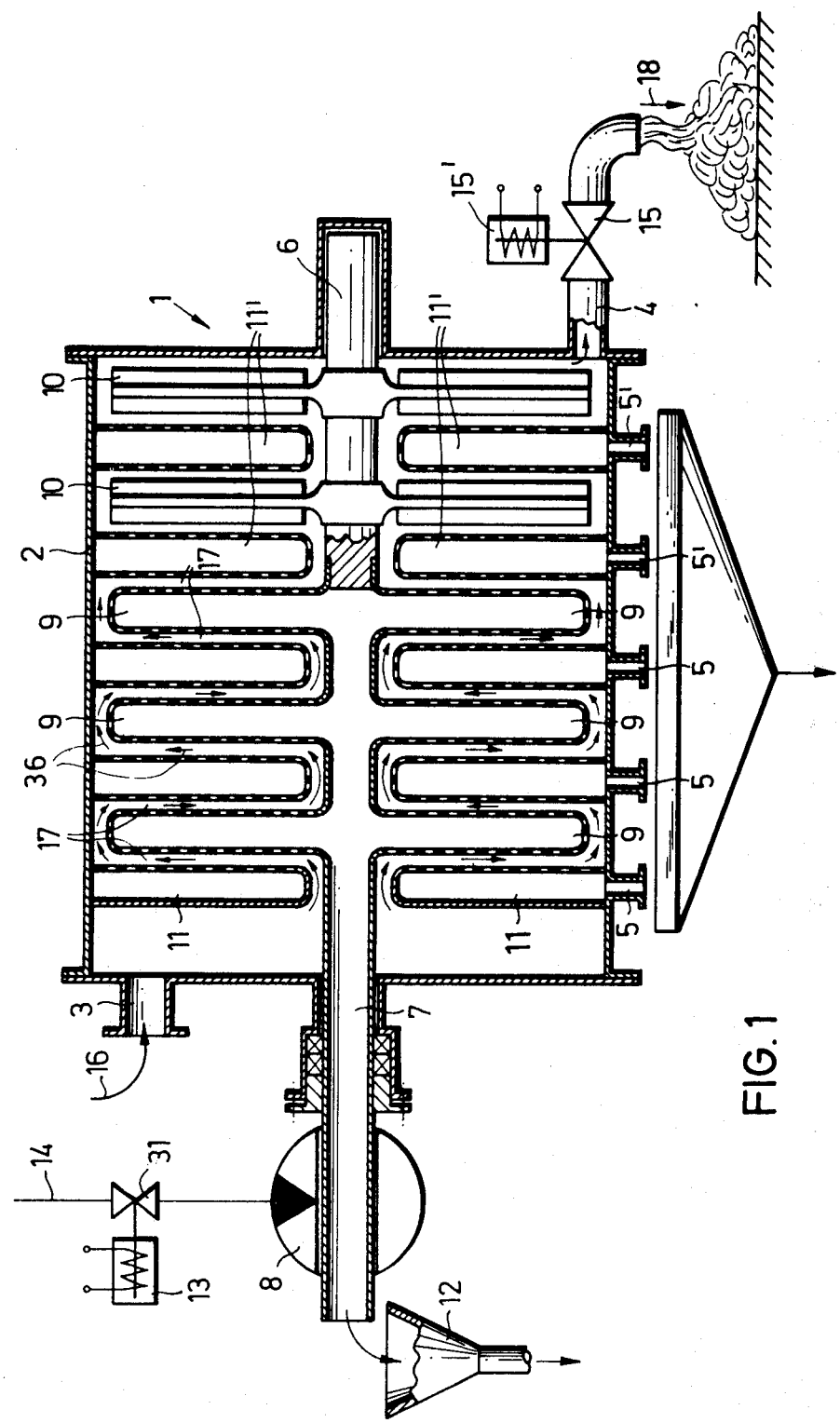
FIG. 1 is an elevational view, generally in section, of apparatus for dynamic concentration of the suspension, shown in a purely schematic form.

According to FIG. 1, a device for dynamic concentration of a suspension comprises a filter 1 having a housing 2, a supply tube 3 for receiving the suspension to be filled, a discharge tube 4 for discharge of the concentrate, a plurality of discharges 5, 5' for the filtrate, and a stirring device 6.

The stirring device 6 comprises a partially hollow drive shaft 7 which is journaled at the solid end and journaled adjacent the hollow end, a drive motor 8, and a plurality of stirring elements 9, 10. Stationary filter elements 11, 11' are arranged in the interior of the filter housing 2. The stirring elements 9 are likewise designed as filter elements whose filtrate discharge is fed through the hollow shaft 7 to a collecting vessel 12, whereas the stationary filter elements 11, 11' have the filtrate discharges 5, 5' assigned thereto. In the illustrated exemplary embodiment, the motor 8 receives the shaft therethrough, and is coupled thereto in the form of a so-called socket motor. The motor 8 is, in the illustrated example, a hydraulic motor having a volume governor 13, 31 in the hydraulic supply line 14. A discharge control including a valve 15 and a valve operator 15' is arranged in the concentrate discharge 4. In the illustrated exemplary embodiment, the volume governor includes a valve 13 and a valve control 31 and represents a device for setting the RPM of the motor 8.

In operation, the raw suspension, indicated by the arrow 16, is introduced into the filter 1 through the supply tube 3. From the supply tube 3, the suspension, upon advancing dehydration, moves along meander-like paths corresponding to the arrows 36 through the intermediate spaces 17, moving between respective surfaces of the filter elements 11, 11' and parts of the stirring device 9 or, respectively 10, which move relative to the surfaces of the filter elements 11, 11'. Thereby, a progressive thickening and concentration of the solid contained in the suspension occurs and, at the same time, the solid forms a coating on the filter surfaces 9, 11, 11' which, upon increasing precipitation of solids, increases to form the filter cake.

Due to the motion of the stirring elements 9, 10, however, the growth of the filter cake is at least partially limited and the resulting concentrate is mantaned in a flowable state by means of constant reintroduction into the progressively thickened suspension by means of the agigation motion, and, finally, is discharged through the discharge 4 through the valve 15 as a pasty concentrate, as indicated by an arrow 18.

Figure 2:
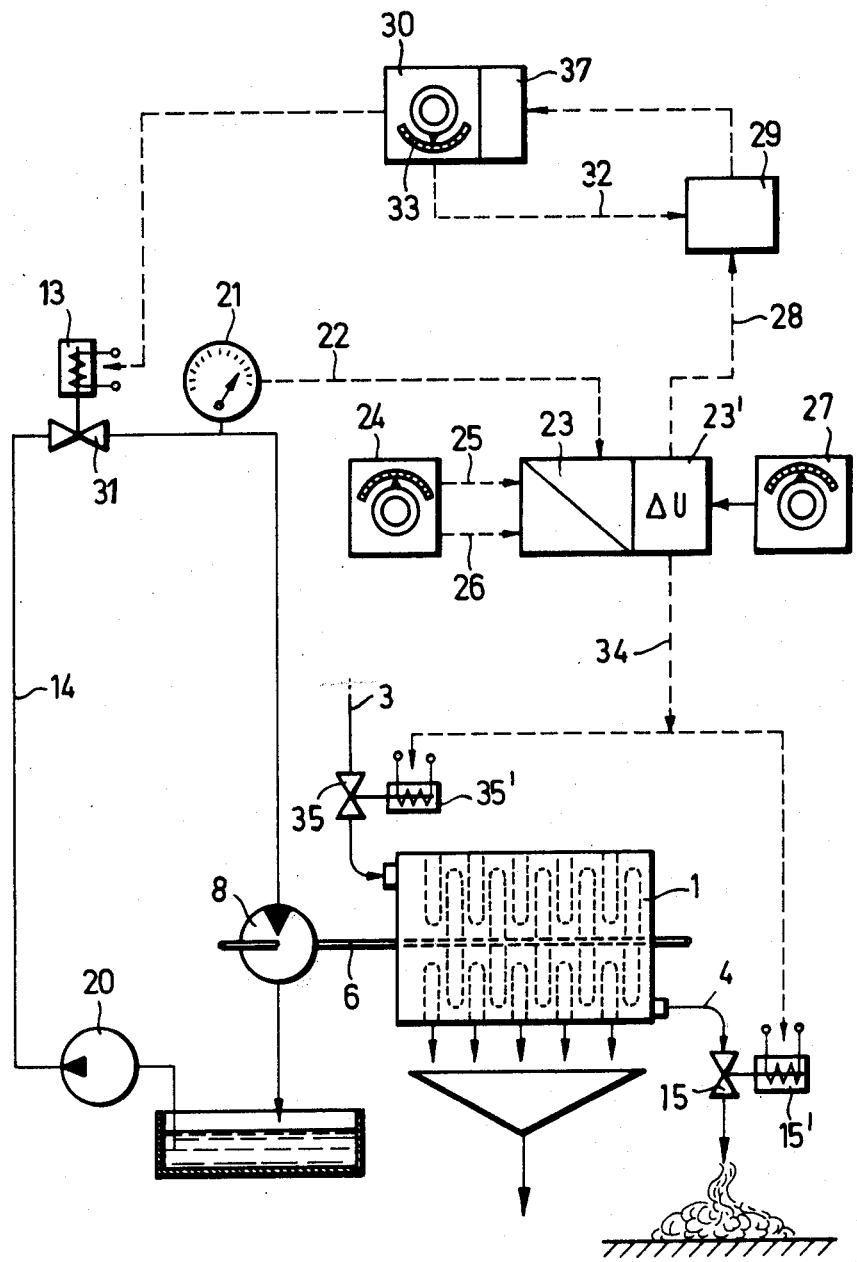
FIG. 2 is a schematic circuit diagram of the functional elements of an electronic control and switching device according to the present invention for controlling dynamic concentration of a suspension and utilized with the apparatus of FIG. 1.

An exemplary embodiment of the invention including the control of operation, is illustrated in block diagram form in FIG. 2. The motor 8 drives the stirring device 6, as previously illustrated in FIG. 1. In the example of FIG. 2, it is a matter of a hydraulic motor, which, first, is charged with a constant flow of hydraulic fluid by means of a pressure pump 20, the line 14 and the volume controlling valve apparatus 13, 31, whereby the stirring device 6 is driven with a constant RPM. The pressure of the working fluid corresponding to a torque of the stirring device 6 is measured by a pressure meter 21 which includes a circuit for generating a signal proportional to the operating torque. The meter 21 therefore also constitutes a signal transmitter which feeds a obtained signal to a logic and computational unit 23 by way of a line 22. The upper and lower index values are manually set at a signal generator 24 which provides the upper and lower index values as digital signals over respective control lines 25 and 26 to the logic and computational unit 23. The logic unit 23 compares the actual value of the torque arriving via the control line 22 with the index values and, upon transgression of the upper index value or upon transgression of the lower index value, triggers a control and setting pulse ΔU calculated by the computational portion 23', which pulse ΔU, with the assistance of the control line 28, sets the control element 31 of the volume controlling valve 13 and, therefore, the RPM of the motor 8, by way of a switching element 29 and a time delay relay 30. The time delay relay 30 assumes the control in that it influences the switching element 29 by way of a control line 32 to interrupt the line 28.

A memory unit 37 assumes the control of the higher or lower RPM set in accordance with the method of the invention for the duration of the temporal interval which is predetermined with a manually adjustable time element 33. After termination of the predetermined interval, the time delay relay 30 emits a reset pulse over the line 32 to again close the switch 29 and permit recontrol by the logic unit 23 which causes the volume controlling valve 13 to be reset by means of the adjusting element 31 to the original position digitally predetermined with a manually adjustable input unit 27 and, therefore, the originally predetermined RPM is again set.

Subsequently, the control operation is repeated to the end that the logic unit 23, after resetting the motor 8 into the operating RPM originally predetermined with the input unit 27, compares the torque now newly determined with the index values predetermined and set by means of the input unit 24 and determines whether the torque newly set after the termination of the control operation at the originally predetermined operating RPM is within the upper and lower limit values. If the torque determined by the measuring value transmitter 21 transgresses one of these limiting values, then the control operation is repeated as described above.

At the same time as, and analogous to such a control operation, an additional influence of the volume controlling valves 35 for the delivered raw suspension and 15 for the concentrate to be discharged can be provided with a control line 34 extending from the computational unit 23' to the end that, given an RPM increase, the volume controller 35 is chocked and the volume controller 15 is opened somewhat more, and vice versa.

The invention is not simply limited to the exemplary embodiments illustrated in FIGS. 1 and 2. At the discretion of those skilled in the art, these can be modified in the most various ways. For example, an electric drive can be provided instead of a hydraulic drive. The various switching and control elements of the control loop can also be combined into electronic units for the automation of the process in the form of module systems.

Although we have described our invention with respect to specific embodiments thereof, many changes and modifications of the invention may become apparent to those skilled in the art without departing from the spirit and scope of the invention. We therefore, intend that the patent warranted hereon include all such changes and modifications as may reasonably and properly be included within the scope of our contribution to the art.

We claim:

1. In a method of dynamic concentration of a suspension in which the suspension is fed into a filter which has a stirring device driven by a drive device and forms a filter cake which is continually remixed by stirring with the suspension being dehydrated and maintained in a liquid state up to the desired degree of concentration, the improvement therein comprising the steps of:
   measuring the power consumption of the stirring device; and
   controlling the intensity of the stirring motion in accordance with the measured power consumption.

2. The improved method of claim 1, further defined by the steps of:
   driving the stirring device at a predetermined number of revolutions per minute which represents a predetermined value of power consumption;
   setting upper and lower power consumption limits; and
   changing the number of revolutions per minute of the stirring device in an opposite direction upon measuring a transgression of a power consumption limit.

3. The improved method of claim 2, comprising the steps of:
   changing the number of revolutions per minute for a predetermined interval independently of the power consumption during that interval; and resetting the revolutions per minute to the predetermined number at the end of the predetermined time interval.

4. The improved method of claim 2, wherein the step of measuring power consumption is defined as:
   measuring the drive torque of the stirring device.

5. The improved method of claim 4, wherein the step of changing the revolutions per minute of the stirring device is further defined by the steps of:
   measuring the gradient of the change of torque per unit time; and
   deriving a speed control parameter for the drive device in accordance with the measured torque gradient.

6. The improved method of claim 5, comprising the step of:
   rendering the measured torque ineffective during the predetermined interval during which the number of revolutions per minute is changed.

7. The improved method of claim 2, comprising the further step of:
   during the step of changing the number of revolutions per minute, controlling the discharge of the concentrate to a flow compatible with the adjusted speed.

8. The improved method of claim 2, comprising the further step of:
   during the step of changing the number of revolutions per minute, controlling the intake of the suspension to a flow compatible with the adjusted speed.

9. An apparatus for dynamic concentration of a suspension, comprising:
   a filter including a suspension intake, a concentrate discharge and a rotatable stirring device;
   a prime mover connected to and operable to rotate said stirring device;
   first means connected to said prime mover for operating said stirring device at a predetermined speed;
   second means connected to said prime mover for measuring the power consumption and providing an actual speed signal;
   comparison means connected to said second means;
   third means connected to said comparison means and operable to feed upper and lower limit values to said comparison means, said comparison means operable in response to an actual speed signal which transgresses a limit signal to limit a speed correction signal; and fourth means connected between said third means and said prime mover for adjusting the operating speed in response to the speed correction signal.

10. The apparatus of claim 9, wherein said comparison means comprises a logic and control unit and said fourth means comprises a time delay relay operable to maintain the corrected speed for a predetermined interval.

11. The apparatus of claim 10, wherein said fourth means comprises memory means for storing the speed correction signal and switching means connected between said logic and control unit and said memory and operated by said time delay relay to an open condition during the predetermined interval.

12. The apparatus of claim 10, comprising a speed input circuit connected to said logic and control unit for inputting a predetermined speed signal.

13. The apparatus of claim 10, comprising an intake control valve connected to and operated by said logic and control unit.

14. The apparatus of claim 10, comprising a discharge valve connected to and operated by said logic and control unit.

* * * * *